United States Patent [19]
Ely

[11] 3,877,523
[45] Apr. 15, 1975

[54] ELONGATED COMPOSITE TENSION MEMBERS

[75] Inventor: Richard Anthony Ely, Redmarley, England

[73] Assignee: Transmission Developments Limited, Gloucester, England

[22] Filed: June 27, 1973

[21] Appl. No.: 374,134

[30] Foreign Application Priority Data
June 30, 1972 United Kingdom.............. 30780/72

[52] U.S. Cl. ............ 403/202; 174/177; 428/107; 428/169
[51] Int. Cl............................................. B32b 5/12
[58] Field of Search ......... 161/55, 57, 60, 111, 112, 161/121, 144; 174/176, 177, 178, 179

[56] References Cited
UNITED STATES PATENTS

| | | | |
|---|---|---|---|
| 2,464,908 | 3/1949 | Volkmann | 174/177 |
| 3,328,229 | 6/1967 | Windecker | 174/176 |
| 3,669,566 | 6/1972 | Bourquardez et al. | 161/144 |
| 3,765,996 | 10/1973 | Munyon | 161/60 |

FOREIGN PATENTS OR APPLICATIONS

| | | | |
|---|---|---|---|
| 1,044,196 | 11/1958 | Germany | 174/176 |
| 1,540,531 | 1/1970 | Germany | 174/179 |
| 1,071,178 | 12/1959 | Germany | 174/177 |

*Primary Examiner*—William J. Van Balen
*Assistant Examiner*—William R. Dixon, Jr.
*Attorney, Agent, or Firm*—Young & Thompson

[57] ABSTRACT

A central tensile core for a composite tension member is formed from a plurality of main reinforcing laminations including bonded fibres. The end of the core provides an anchorage portion having a serrated surface which can mate with an anchorage to hold the anchorage portion within an end fitting. The core has cross reinforcing laminations lying in a plane parallel with the plane of the main laminations to provide shear strength in a plane parallel with the length of the core and with the serrated surface.

7 Claims, 7 Drawing Figures

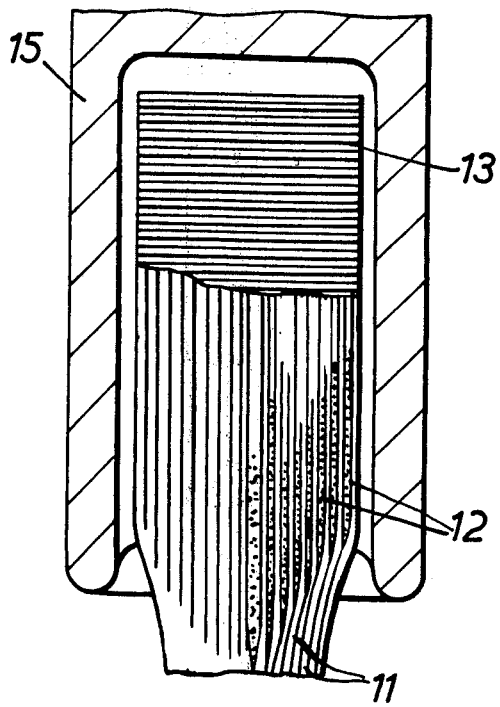

ELONGATED COMPOSITE TENSION MEMBERS

This invention relates to elongated composite tension members comprising a plurality of reinforcing stands or fibres extending parallel with the length of the member and combined, impregnated or bonded with a synthetic plastics material.

Difficulties are experienced in providing an effective anchorage for applying a tensile force to such a composite member, where the main reinforcing stands or fibres are uni-directional and parallel to its length. For example if transverse holdes or drillings are formed through the member to receive anchorage bolts or pins the longitudinal fibres will be interrupted, the strength of the member at the anchorage will be seriously reduced, and in order to obtain adequate tensile strength the transverse dimensions of the member may have to be increased undesirably. Accordingly it is a particular object of the invention to provide an effective anchorage for a composite tension member having uni-directional fibre reinforcement, which will provide adequate tensile strength at the anchorage without excessive increase in the dimensions, bulk or weight of the member.

Broadly stated the invention consists in an elongated composite tension member comprising a plurality of reinforcing layers or laminations including reinforcing strands or fibres extending parallel with the length of the member, combined, impregnated or bonded with a synthetic plastics material, the member having an anchorage portion where the external surface of the member is formed with projections and/or depressions, such as transverse grooves, ribs, corrugations, or like formations, capable of providing a mechanical force transmitting surface, and adjacent the anchorage portion the member being provided with one or more cross reinforcing layers or laminations each lying in a plane parallel with the planes of the first mentioned laminations, and each having substantial shear strength to resist shear in a plane parallel with the length of the member and parallel with the surface of the member in which the said anchorage formations are provided.

According to a preferred feature of the invention the cross reinforcing layers or laminations have substantial tensile strength in directions transverse to the length of the member, and transverse to the plane of the surface of the member in which the said anchorage formations are provided.

These cross reinforcing layers or laminations may be formed of a homogeneous material such as metal, providing similar tensile strength and shear strength both parallel to the length of the member and transverse thereto. However in preferred forms of the invention these cross reinforcing layers or laminations themselves comprise reinforcing strands or fibres of identical composition with the main lengthwise reinforcing layers extended in the plane of each lamination transverse to the length of the member. Thus in either case the shear strength and transverse tensile strength are greater than those of the main longitudinal reinforcing layers.

According to another preferred feature of the invention the cross reinforcing layers or laminations extend lengthwise of the member a limited distance only adjacent the anchorage portion thereof. Conveniently also the transverse dimensions of the member, at positions spaced lengthwise from the anchorage portion are substantially uniform in the planes of the cross reinforcing layers or laminations but are reduced in transverse planes perpendicular thereto.

The reinforcing layers or laminations may be of various compositions and constructions and the reinforcing strands or fibres may be laid in various different ways but preferably the laminations comprise continuous filaments or fibres, e.g. of glass, carbon, or metal wire, with a bonding matrix of synthetic hardenable resinous material, ceramic or metal.

The anchorage formation may take various shapes but in some preferred embodiments of the invention they comprise a plurality of longitudinally spaced parallel grooves or ribs extending transverse to the length of the member. Preferably the anchorage formations are provided on two opposed surfaces thereof.

The invention also consists in a tension member as defined above in combination with an anchorage having corresponding formations to engage in and mechanically key with the anchorage formations on the member. The anchorage may include at least one metal plate or part shaped to cooperate with the anchorage formations. Alternatively or in addition a high strength synthetic resin may be introduced in fluid form into the gap between the anchorage formations and the anchorage unit, and caused to harden in-situ in order to provide a mechanical connection.

The cross reinforcing laminations effectively behave as a series of laminar beams which span the distance between and are supported by the anchorage parts or plates. Between these laminar beams are interleaved the longitudinal laminations of the elongate composite tension member. A good interfacial bond formed between the longitudinal and transverse laminations will achieve the effect that each longitudinal lamination is securely held between the adjacent faces of a pair of laminar beams. The large interfacial bond area between the laminar beams and the longitudinal laminations results in a relatively low interfacial shear stress for a large tensile load distributed uniformly across the width of the longitudinal laminations.

The invention is particulary applicable to tension member requiring high strength and light weight. It is of further advantage when made of insulating materials, e.g. glass fibres and resin, for use in electrical applications where electrical insulating properties are required. For example tension members according to the invention may be used as tensile load bearing strength members or cores of a composite insulator for high tension cables, or as operating rods for electrical switch gear. The tension members may however be of general applicability wherever high tensile strength is require in a composite tension member or tie rod.

The invention may be performed in various ways and one particular embodiment with various possible modifications will now be described by way of example with reference to the accompanying drawings in which:

FIG. 1 is a side elevation of a tension member according to the invention located between two anchorage units, FIG. 2 is a sectional side elevation on an enlarged scale through one of the anchorage units showing the anchorage formations on the tension member, FIG. 3 is a sectional end elevation corresponding to FIG. 2, FIGS. 4(a), (b) and (c) illustrate three possible variations of toothed anchorage formations which may be provided on the tension member, and FIG. 4(d) illustrates diagrammatically on an enlarged scale the relationship of the laminations and glass fibre reinforcement to the tooth profile.

In the embodiment illustrated in FIGS. 1, 2 and 3 the tension member 10 is of composite construction comprising a number of closely spaced layers or laminations each comprising large numbers of parallel glass fibre filaments, spun yarns, or rovings, impregnated and bonded with an epoxy resin. The glass fibres are continuous and extend parallel with the length of the member and the planes of these main reinforcing laminations are parallel with the plane of the paper in FIGS. 1 and 2 and perpendicular to the plane of the paper as shown at 11 in FIG. 3. A laminated fibre reinforced composite member in which all the fibres are parallel to the longitudinal axis (unidirectional) has excellent "intrinsic" tensile strength and good electrical insulating qualities, but its shear strength in planes parallel with the length of the member, and particularly in planes parallel with the planes of the main laminations, is weak, as also is its tensile strength in directions transverse to the length axis.

At each opposite end of the tension member 10, which constitutes an anchorage portion, the member is provided in the course of manufacture with a large number of interleaved cross-reinforcing laminations 12 which extend over a limited length only, those adjacent the centre line of the member preferably being somewhat longer than those adjacent the opposite surfaces as shown in FIG. 3. In this example these cross reinforcing laminations are of the same composition and construction as the main laminations 11, but are laid with the reinforcing glass fibres extending transverse to the length of the tension member. Each of these cross reinforcing laminations therefore provides substantial shear strength in planes parallel to the length of the member and also substantial tensile strength in transverse directions, by comparison with the main reinforcing laminations. As shown in FIG. 3 the main reinforcing laminations are interleaved with the cross reinforcing laminations and extend the full length of the tension member, whose transverse dimensions in the plane of FIG. 3 are correspondingly increased at the anchorage portion. In the orthogonal transverse direction the dimensions of the tension member are however constant, as shown in FIG. 2.

The two opposite surfaces of the anchorage portion of the tension member as shown in FIG. 2 are formed with a large number of transverse grooves or corrugated teeth 13. These surfaces of the tension member in which the anchorage formations are provided, are those faces which are intersected by the planes of the main and cross-reinforcing laminations. Thus it will be noted that the cross reinforcing laminations provide relatively great shear strength to resist shear in planes parallel with those surfaces in which the anchorage formations are provided.

Each anchorage unit comprises a metal yoke or cap 15 with an internal socket having two opposed walls 16 which face but are appreciably spaced from the toothed surfaces of the tension member, and interposed between each of these walls 16 and the adjacent toothed surface of the tension member is a metal anchorage plate 17. Each anchorage plate 17 is formed with a corrugated toothed surface designed to mate and match with the adjacent toothed surface on the tension member and each plate is also formed on its opposite face with a pair of longitudinally spaced blind holes to receive the ends of a pair of pins 18 which are inserted through corresponding drillings in the walls 16 and located in position after final assembly, for example by peening over the lips of these drillings when the pins have been inserted. This provides a rigid connection between the plate 17 and the end cap 15 and also provides an efficient mechanical connection or key between the plates and the tension member.

Each anchorage unit is also provided either with an under cut socket formation 20 for connection to an external member by which tensile force is applied to the assembly, or alternatively, as shown at the bottom of FIG. 1, a type of clevis joint 21 may be provided.

FIG. 4 illustrates three possible forms of toothed anchorage formations which may be used at the ends of the tension member. The corrugated tooth formation shown as FIG. 4(a) is similar to a conventional Whitworth screw thread where the included tooth angle is approximately 55° with the tip and root slightly rounded and the flanks planar. The tooth pitch interval, the depth of the teeth, and the tooth flank angles may be varied to suit different applications. In general the tensile load bearing capacity of the anchorage construction will depend amongst other factors on the number of teeth, and the total projected area of the teeth flank surfaces projected onto planes transverse to the length axis. If however the included angles of the teeth are reduced, the width of each tooth at its root is likewise reduced and therefore its capacity to resist shear strain offsets the increase in the number of teeth. The alternative corrugated tooth construction illustrated in FIG. 4(b) provides a relatively small number of teeth for any given length but the longitudinal dimension or thickness of each tooth adjacent its root is considerably increased. In the further design illustrated in FIG. 4(c) the anchorage portion of the tension member is formed with a number of spaced parallel grooves of approximately semi-circular cross section, spaced apart at intervals somewhat greater than the diameter of each groove, thus providing an effect similar to that of FIG. 4(b) but with radiused curves rather than sharp grooves. In all cases the anchorage unit will be provided with surfaces which match and interlock with the anchorage formations on the tension member itself.

It will be noted that the strands or fibres of the cross reinforcing layers or laminations 12 extend transversely and project into the teeth as illustrated diagrammatically at 9 in FIG. 4(d), and these laminations 12 therefore provide substantial shear strength to resist shear in planes parallel with the length of the member and parallel with the surface in which the toothed corrugations are formed. These cross reinforcing laminations 12 being interleaved with the main reinforcing laminations 11, are also reinforced in their ability to resist the high shear forces applied, by the ability of the main reinforcing laminations to provide high tensile strength parallel to the length of the member and good shear strength in directions parallel with the fibres of the cross reinforcing laminations.

Instead of grooves or corrugations other locating formations such as shallow depressions or blind holes may be formed in the opposed faces if the tension member, and the invention may be performed, though to some extent less effectively, by providing a screw thread around its whole external surface.

I claim:

1. An elongated composite tension member comprising a plurality of reinforcing laminations including continuous reinforcing fibres, selected from the class consisting of glass, carbon and metal wire, extending parallel with the length of the member, combined with a synthetic hardenable resinous material, the member having an anchorage portion where mutually opposed external surfaces of the member are formed to define transverse depressions, capable of providing a mechanical force transmitting surface, and at least one cross-reinforcing lamination of continuous reinforcing fibres all lying in a plane parallel with the planes of the first mentioned laminations and all extending longitududinally between the surfaces providing said anchorage formations, each of the cross-reinforcing laminations having substantial shear strength to resist shear in a plane parallel with the length of the member and parallel with the surfaces of the member in which the said anchorage formations are provided, and having substantial tensile strength in directions transverse to the length of the member, and transverse to the plane of the surfaces of the member in which the said anchorage formations are provided.

2. A tension member according to claim 1 wherein the transverse dimensions along the length of the member, in the planes of the cross-reinforcing lamination, are substantially uniform, but are increased in transverse planes perpendicular thereto in the region of the anchorage portion.

3. A tension member according to claim 1 wherein each cross-reinforcing lamination extends lengthwise of the member a limited distance only adjacent the anchorage portion thereof.

4. A tension member according to claim 1 wherein the anchorage formations comprise a plurality of longitudinally spaced parallel grooves extending transverse to the length of the member.

5. A tension member according to claim 1 in combination with an anchorage formed with corresponding formations to engage in and mechanically key with the anchorage formations on the member.

6. A combination according to claim 5 wherein the anchorage includes at least one metal part shaped to cooperate with the anchorage formations.

7. A combination according to claim 6 in which the metal part defines at least one passageway and an anchorage pin is received therein to locate the plate or part within an end fitting.

* * * * *